(No Model.)
W. E. HARDING.
PHOTOGRAPHIC RETOUCHING TABLE.
No. 603,765.  Patented May 10, 1898.
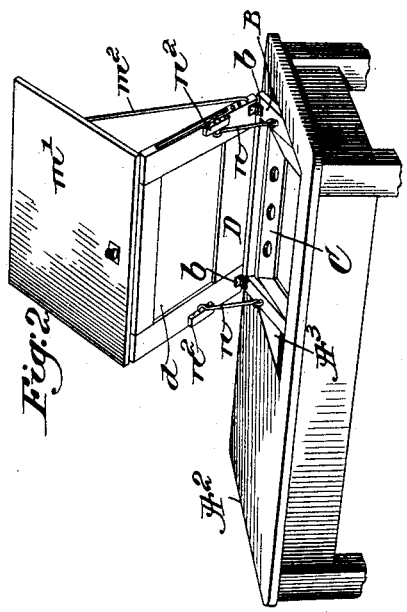
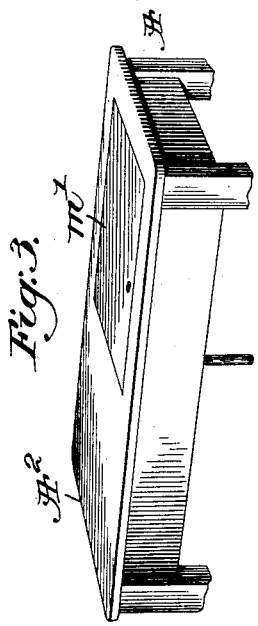
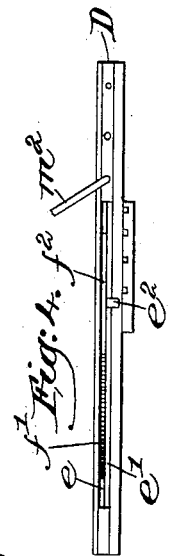
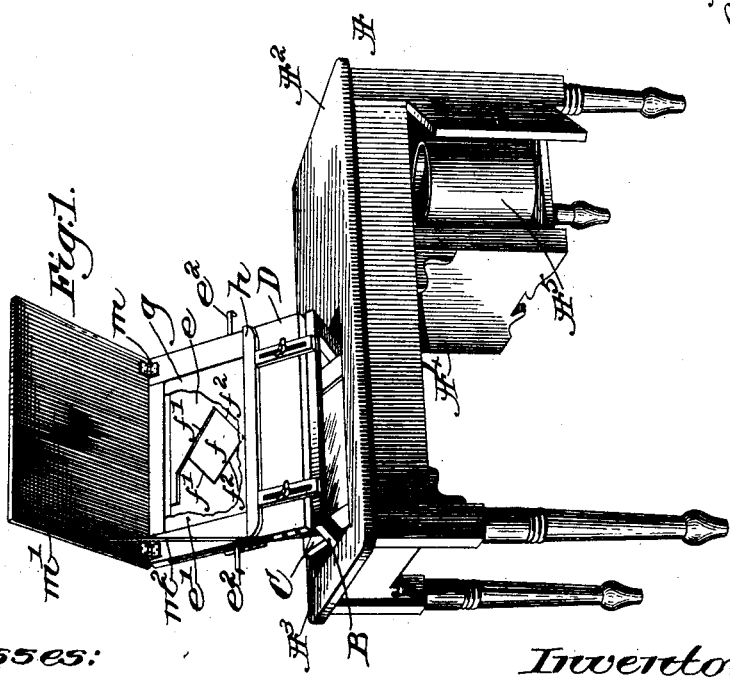
Witnesses:
A. C. Harmon
Edward F. Allen
Inventor.
William E. Harding
by Crosby Gregory
attys.

UNITED STATES PATENT OFFICE.

WILLIAM EDGAR HARDING, OF SOUTH FRAMINGHAM, MASSACHUSETTS.

PHOTOGRAPHIC RETOUCHING-TABLE.

SPECIFICATION forming part of Letters Patent No. 603,765, dated May 10, 1898.

Application filed December 6, 1897. Serial No. 660,899. (No model.)

*To all whom it may concern:*

Be it known that I, WILLIAM EDGAR HARDING, of South Framingham, county of Middlesex, State of Massachusetts, have invented an Improvement in Photographic Negative or Retouching Tables, of which the following description, in connection with the accompanying drawings, is a specification, like letters on the drawings representing like parts.

This invention has for its object the production of a novel apparatus adapted to the use of photographers and the like for use in holding and retouching negatives.

In accordance with my invention I employ a table in the top of which I have mounted a rocking frame, in which I have pivoted a mirror, and this rocking frame has in turn hinged upon it a support having an opaque shield, such as ground glass, and containing adjustable slides having their contiguous ends so shaped that by moving one of said shields upon the other the light-space may be contracted or narrowed and brought to any particular portion of the negative to be retouched, the said support having hinged to it in any adjustable manner a screen.

Figure 1, in elevation, shows a table with my improved apparatus mounted thereon in working position. Fig. 2 is a rear elevation of part of Fig. 1. Fig. 3 shows the table-top with the apparatus represented as extended for use in Figs. 1 and 2 closed and out of use, and Fig. 4 is an edge view of one of the side bars of the support D.

In the drawings let A represent a suitable table-frame provided with a top $A^2$, having an opening $A^3$, said frame having a suitable depending box $A^4$, in which I may place electric or other battery cells by which to actuate the usual negative-retouching device, which in ordinary practice is operated by electricity.

The table-frame at a point below the top $A^2$ has pivotally mounted within it a hollow frame B, so that said frame may be tipped and drawn up through the opening $A^3$ of the top or may be shut down into the top.

The hollow frame B has pivoted centrally in it a frame C, containing a mirror or other suitable reflector, and the free end of the frame B has also connected to it by a suitable hinge, as $b$, (see Fig. 2,) a support D. This support has at its under side a suitable opaque substance, such as ground glass, (see $d$, Fig. 2,) and the side bars of this support, which is made as a hollow frame, are slotted and receive each a like slide, as $e\ e'$, said slides having, preferably, extension-pieces, as $e^2$, which may be engaged by the operator to move either or both slides in one or the other direction, so that one slide may overlap the other slide more or less and thereby contract or enlarge the spaces $f$, (see Fig. 1,) said spaces being formed by notching each slide, as at $f'\ f^2$. It will be obvious that this space may be made smaller by causing the slides to overlap further and made larger by separating the slides. It will also be obvious that this opening or space $f$ may be positioned at any desired portion of the support D and be of any required size, that depending upon the particular size of the negative to be retouched and the quantity of light desired at any particular point. The upper portion of this frame $e$ will have a pane of transparent glass, as $g$, set into it flush, the inner side of the pane of glass resting upon the slides. The support has adjustably connected with it a rest $h$, which will sustain the lower end of the negative to be retouched, the adjustment of the rest $h$ enabling the negative to be fully controlled.

To the upper end of the support D, I have hinged, as at $m$, a screen $m'$, and said screen has connected adjustably with it an adjusting device $m^2$, shown as a rod, one end of which is turned to present a projection to enter one of a series of holes made in the edge of one of the side bars of the support D, so that said screen may be tipped more or less as required by the operator. I have also joined to the frame B an adjusting device, shown as a hook $n$, which enters with its turned end one or another of the series of holes in a block $n^2$, fastened to the side bars of the support D, so that said support and the frame B may be adjusted each to the other to any desired angle.

The mirror C may be adjusted or tipped with its frame B, to thus control the reflection of the light from it to exactly the desired position with relation to the support D.

When not in use, the movable part of the apparatus described may be folded, as represented in Fig. 3, and the outer side of the screen $m'$ will lie flush with the top of the table $A^2$.

Having described my invention, what I claim as new, and desire to secure by Letters Patent, is—

1. In a negative-retouching apparatus, a movable frame, as B, means to support it, a mirror pivotally mounted with relation to said frame and a support mounted upon said pivoted frame, said support containing movable slides having notched or cut-away ends and adapted to overlap one the other, the adjustment of said movable slides controlling the light-opening between them, and a hinged screen mounted upon said support, substantially as described.

2. A table having an opening cut in its top, a frame pivoted at one end below said top and having pivoted within it a mirror-frame, combined with a support having movable slides adapted by their change of position to make a larger or smaller space as $f$, and a screen connected with said support, the said frame, support and screen when folded up entering the space in the table and being held concealed in the table-frame with the exception of the screen, substantially as described.

3. A pivoted frame, as B, having a mirror pivotally mounted within it, and a support hinged to said movable frame, and provided with movable slides notched at their edges, as at $f'$, $f^2$, to leave a space between them, a rest for a negative, a screen, and means to adjust said support into any desired position with relation to said frame and to adjust the screen with relation to said support, substantially as described.

4. In a negative-retouching frame, a support made as a frame having slotted side bars and provided with glass at its center, combined with notched sliding plates overlapping one the other and adapted to be slid transversely in said support to thereby control the size of the space presented between said sliding plates for the passage of light through said support, substantially as described.

In testimony whereof I have signed my name to this specification in the presence of two subscribing witnesses.

WILLIAM EDGAR HARDING.

Witnesses:
WALLACE H. FRANKLAND,
LYMAN H. HOOKER.